Sept. 4, 1945.                F. R. LUDWELL                2,384,183
                             SAFETY HEADGEAR
                        Original Filed May 19, 1941
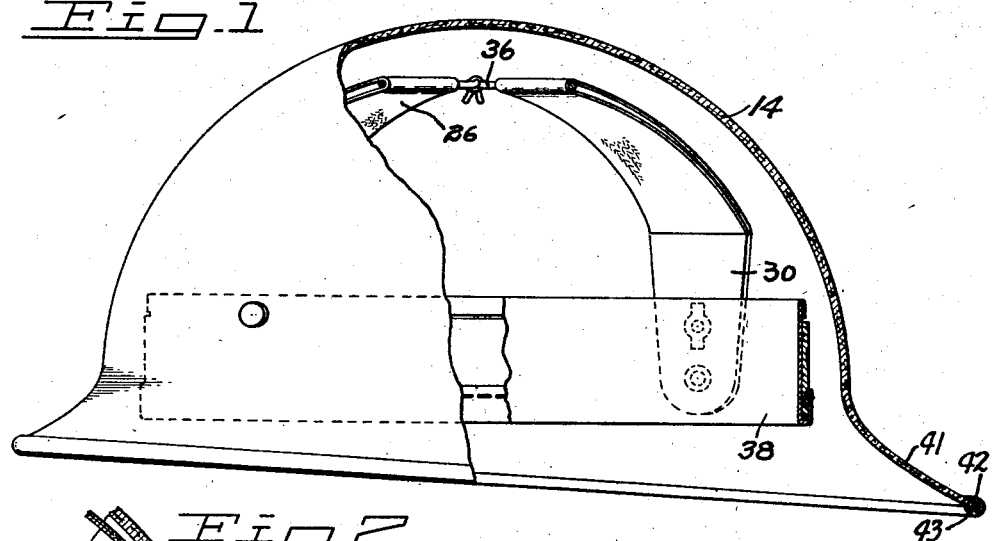
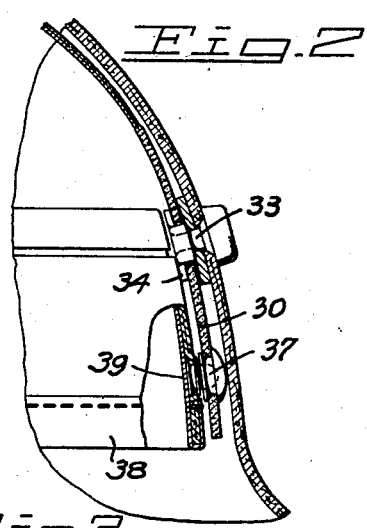
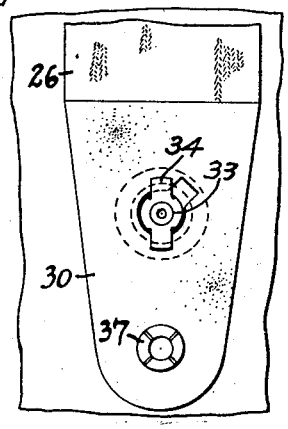
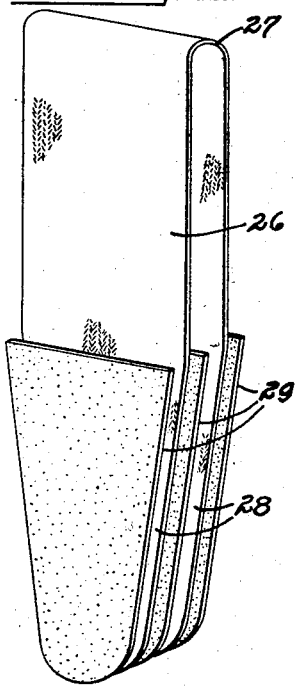
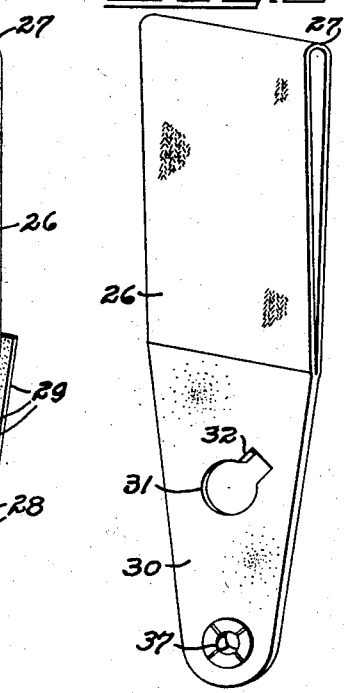
INVENTOR
FREDERICK R. LUDWELL
BY Charles S. Evans
HIS ATTORNEY Patented Sept. 4, 1945

2,384,183

UNITED STATES PATENT OFFICE 2,384,183

SAFETY HEADGEAR

Frederick R. Ludwell, San Jose, Calif., assignor to E. D. Bullard Company, San Francisco, Calif., a corporation of California Original application May 19, 1941, Serial No. 394,233. Divided and this application October 18, 1943, Serial No. 506,702

10 Claims. (Cl. 2—3)

My invention relates to improved safety headgear of the type used by industrial workmen and others exposed to the risk of injury by falling objects, and to suspension means for fitting and supporting such headgear upon the wearer's head.

It is among the objects of my invention to provide a safety hat having improved suspension means for adapting the hat to the head of a wearer, including suspension straps and supporting members of improved construction.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

In the drawing:

Figure 1 is a side elevation, partly in vertical section, of a protective hat made in accordance with my invention.

Figure 2 is a fragmental sectional detail illustrating a preferred form of the suspension mounting.

Figure 3 is a fragmental view showing in elevation the mounting section of a suspension strap in engagement with a supporting member.

Figure 4 is a perspective view illustrating one method by which the suspension straps of my invention are formed.

Figure 5 is a perspective view of the suspension strap in its completed form.

In terms of broad inclusion my invention comprises safety headgear provided with an improved form of suspension wherein head straps formed of flexible strip material are treated preferably with thermo-setting or thermo-plastic material, for forming relatively hard rigid end sections integral with the strap for engaging suitable supporting elements carried by the headgear, and arranged to facilitate the assembling, adjusting and replacing of the suspension members. Preferably, a metal bead is applied for reinforcing the edge of the brim.

The present application is a division of my application Serial No. 394,233, filed May 19, 1941.

In terms of greater detail, the safety headgear of my invention comprises a body 14, preferably formed of a myriad of fibers matted together in unoriented relation and consolidated and embedded in formable plastic which is converted to a desne hard condition by a suitable molding operation under heat and pressure. Since the structure of such headgear, and the method of producing the same, is fully disclosed in my said application Serial No. 394,233, of which this application is a division, a detailed description thereof is omitted herefrom.

After the molding operation, the headgear is fitted with suitable suspension members for adapting the formed body to the head of the wearer. For this purpose I prefer a suspension comprising a plurality of suspension head straps 26 each comprising a strip of flexible fabric, such as tape or canvas, doubled to form a loop 27. The ends of the strip are treated to render them sufficiently tough, hard and rigid to permit them to serve for attaching the straps to the headgear. In the drawing I have illustrated one practical construction wherein the ends 28 of the strip are interlaid between pieces of fabric 29 impregnated with thermo-setting plastic material, such as a phenol-formaldehyde condensation product. By suitable application of pressure and heat, the plastic is caused to penetrate the ends 28 and to bond the same together in a relatively hard rigid section 30 integrally united with the loop. The ends of the strip may be separately impregnated and reinforced with plastic, or other stiffening and reinforcing material if desired.

The straps 26 are secured within the crown portion of the headgear by means of supporting members 33 riveted or otherwise secured to the lower portion of the crown, as best shown in Figures 2 and 3 of the drawing. Each member 33 is provided with a main cylindrical body portion which serves as a bearing, and with retaining flanges 34 extending laterally from the body in spaced relation to the adjacent surface of the crown.

The sections 30 of the suspension straps have apertures 31 formed therein to engage the supporting members 33. The apertures 31 are arranged to provide bearing engagement with the cylindrical body portions of the supporting members 33. Lateral extensions 32 of the apertures 31 are arranged to permit the sections 30 to be moved onto their supporting members when the sections are turned to align the extensions with the flanges 34. After a section 30 has been moved onto a member 33, the section is turned to a normal position with the extension 32 out of alignment with the adjacent flange 34 which serves thereafter to prevent inadvertent disengagement of the section 30 and its supporting member. The sections 30 pivot freely upon the supporting members 33; and may be readily removed and replaced when desired.

The suspension straps are adjustably connected at their upper ends within the upper crown portion of the headgear by an adjusting cord 36 passing through the looped ends of the straps. The lower ends of the sections 30 are provided with suitable fasteners 37 positioned below the supporting members 33, for detachably engaging a head band 38.

The head band 38 constitutes a continuous ring, provided with fasteners 39 arranged to cooperate with the fasteners 37 for securing the band within the lower portion of the crown. Bands are provided to fit various head sizes, and by selecting a head band of proper size, a standard hat body can be fitted to the head of any wearer. The head band is made sufficiently flexible to conform to various shapes of head; and the pivot mounting of the strap sections 30 upon the members 33 permit the sections 30 to turn sufficiently to accommodate any normal distortion of the head band to conform to various head shapes.

The drawing illustrates a form of headgear having a brim 41. Preferably the edge of the brim is reinforced by a metal bead 42 extending entirely around the brim. The bead may be applied in any convenient manner, as for example by rolling the bead onto the brim after the molding operation. The edge of the brim may be molded flat; or if desired the edge may be molded with an integral bead 43 over which the metal bead 42 may be rolled as shown in Figure 1. The metal bead 42 serves to prevent the edge of the brim from being chipped or cracked if the hat is dropped.

I claim:

1. A safety hat comprising a body of molded plastic material containing a myriad of unoriented fibers extending indiscriminately in all directions throughout the entire body, suspension supports upon the inside of the body, a plurality of suspension straps, each provided with a mounting portion having formable plastic material consolidated therewith, and means upon the mounting portions for attaching the same to the suspension supports.

2. A safety hat comprising a rigid body provided with suspension supports, a plurality of suspension members each comprising a strip of woven fabric doubled to form a loop, formable plastic material consolidated with the end portions of each strip for forming a relatively rigid mounting section, and means formed in said mounting sections for detachably engaging the suspension supports carried by the hat.

3. Safety headgear comprising a rigid hat body, a plurality of loops of flexible strip material each having end portions of the strip interlaid and consolidated with formable plastic material for forming a relatively rigid end section, said end sections having support engaging apertures formed therein, supporting elements upon the lower portion of the interior of the headgear for engagement with said apertures, means adjustably connecting the loops within the upper portion of the headgear, a head band, and means connecting the head band to the rigid end sections of the loops at points below the supporting elements.

4. Safety headgear comprising a rigid hat body, a plurality of supporting elements secured within the lower crown portion of the headgear and provided with retaining flanges spaced from the inner surface of the crown, a like plurality of suspension straps having flexible loop portions adjustably connected within the top of the crown and also provided with relatively rigid mounting portions apertured for engagement with the supporting elements, each aperture being shaped to permit movement over the retaining flanges when turned to an applying position and to prevent disengagement with the supporting elements when turned to a normal retaining position, a head band, and means connecting the head band to the mounting portions of the suspension straps.

5. A safety hat comprising a body of molded plastic material having reinforcing strands embedded therein, a brim integral with the body, suspension means mounted within the body, and a metal bead applied to the outer edge of the brim.

6. A safety hat comprising a rigid body, a plurality of flexible suspension straps, means adjustably connecting the upper ends of the straps within the top of the hat, means upon the lower ends of the straps for reinforcing and stiffening the same to provide relatively rigid mounting portions, means for attaching said mounting portions to the lower portion of the hat, and a sweat band connected to said mounting portions.

7. A safety hat comprising a rigid body, a plurality of flexible suspension straps adjustably connected at their upper ends within the hat, means upon the lower ends of the straps for reinforcing and stiffening the same to provide relatively rigid strap mounting portions, means engaging said mounting portions for securing the straps to the hat, a sweat band, and means for detachably securing the sweat band to the mounting portion of the straps.

8. A safety hat comprising a rigid body, a plurality of flexible suspension straps, means adjustably connecting the upper ends of the straps within the top of the hat, means applied to the lower end portions of the straps to render them relatively rigid, strap engaging means upon the lower portion of the hat detachably engaging the rigid portions of the straps, and a sweat band detachably secured to the straps.

9. A suspension strap for safety headgear comprising a strip of flexible material having its ends embedded in formable plastic consolidated therewith for providing a relatively stiff rigid mounting portion, said mounting portion having an opening for engaging fastening means for securing the same to a hat body, and sweat band engaging means upon said strap spaced from the opening.

10. In a safety hat, a suspension strap comprising a strip of flexible material having an end portion embedded in and reinforced by formable plastic for providing a relatively stiff rigid mounting portion, and means positioned on said mounting portion for detachably securing the strap to the hat.

FREDERICK R. LUDWELL.